US012345662B2

(12) United States Patent
Kang

(10) Patent No.: US 12,345,662 B2
(45) Date of Patent: Jul. 1, 2025

(54) COMPLEX PERMITTIVITY ESTIMATING APPARATUS AND METHOD

(71) Applicant: HL Klemove Corp., Incheon (KR)

(72) Inventor: YunSu Kang, Suwon-si (KR)

(73) Assignee: HL Klemove Corp., Incheon (KR)

( * ) Notice: Subject to any disclaimer, the term of this patent is extended or adjusted under 35 U.S.C. 154(b) by 441 days.

(21) Appl. No.: 17/857,272

(22) Filed: Jul. 5, 2022

(65) Prior Publication Data

US 2023/0024551 A1  Jan. 26, 2023

(30) Foreign Application Priority Data

Jul. 23, 2021  (KR) ......................... 10-2021-0097114

(51) Int. Cl.
*G01N 22/00* (2006.01)
*D01D 5/098* (2006.01)
(52) U.S. Cl.
CPC ............. *G01N 22/00* (2013.01); *D01D 5/098* (2013.01)
(58) Field of Classification Search
CPC .... G01N 22/00; G01R 27/2682; D01D 5/098; D01F 9/08
USPC ........................................................ 324/462
See application file for complete search history.

(56) References Cited

U.S. PATENT DOCUMENTS

| 2004/0240512 | A1* | 12/2004 | Pesach | G01K 7/343 374/161 |
| 2013/0033574 | A1* | 2/2013 | Kuznetsov | G01S 7/41 348/E5.085 |
| 2017/0131334 | A1* | 5/2017 | Ramzan | G01N 22/00 |
| 2021/0161419 | A1* | 6/2021 | Nakamura | G01N 22/00 |
| 2024/0264094 | A1* | 8/2024 | Howard | G01R 27/2664 |

FOREIGN PATENT DOCUMENTS

| CN | 112688067 A | 4/2021 |
| JP | 2005351728 A1 | 12/2005 |

OTHER PUBLICATIONS

1st Office Action issued in Korean Patent Application No. 10-2021-0097114 dated Feb. 16, 2023.

\* cited by examiner

*Primary Examiner* — Raul J Rios Russo
(74) *Attorney, Agent, or Firm* — Harvest IP Law, LLP

(57) ABSTRACT

The present disclosure relates to a complex permittivity estimating apparatus and a method. More specifically, the complex permittivity estimating apparatus according to the present disclosure includes: a receiver that irradiates a transmission signal such that the transmission signal is reflected on a test dielectric or transmitted through the test dielectric and receives a reflected wave and a transmitted wave for the test dielectric; a determiner that determines simulation data from a simulation table set in advance based on information extracted from at least one of the reflected wave or the transmitted wave; and an estimator that estimates complex permittivity for the test dielectric based on the determined simulation data.

8 Claims, 14 Drawing Sheets

FIG.5
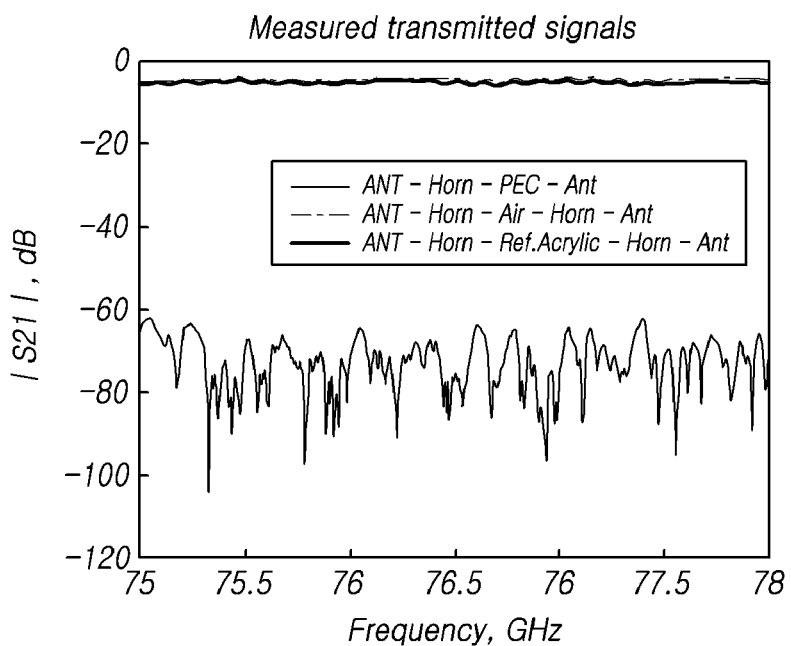
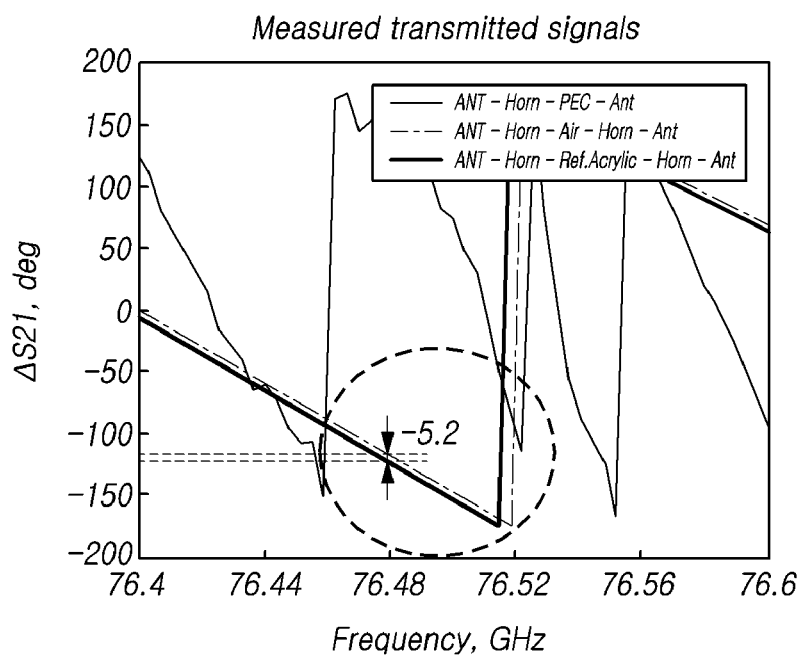

COMPLEX PERMITTIVITY ESTIMATING APPARATUS AND METHOD

CROSS-REFERENCE TO RELATED APPLICATION

This application claims priority from Korean Patent Application No. 10-2021-0097114, filed on Jul. 23, 2021, which is hereby incorporated by reference for all purposes as if fully set forth herein.

BACKGROUND OF THE INVENTION

Field of the Invention

Embodiments relate to a complex permittivity estimating apparatus and a method.

Description of Related Art

Radar technologies represent technologies for detecting objects and acquiring information of the objects using reception signals acquired in accordance with reception of signals transmitted from a transmission antenna of a radar device and reflected on the objects. Such radar technologies have been widely used more and more, and, recently, developments of radar that can be applied to an Advanced Driver Assistance System (ADAS) and the like have progressed.

In communication between a vehicle and a vehicle (V2V) and a vehicle and an infrastructure (V2X), millimeter waves of which wavelengths are in units of millimeters and frequencies are in the band of 30 to 300 GHz are used. The millimeter waves enable many antennas to be integrated in a small space and thus are appropriate for a large-scale Multiple-Input Multiple-Output (MIMO) system.

Meanwhile, while most of electronic devices may be configured on a dielectric substrate, the performance of the electronic device may be greatly changed in accordance with characteristics of a dielectric, and thus it is important to accurately check the characteristics such as permittivity in a used frequency band and the like of the dielectric.

In addition, there are problems in that it is difficult to accurately measure permittivity due to characteristics of millimeter waves of which wavelengths are very short, and a measured value of the permittivity may be greatly changed in accordance with various variables such as a form of a measurement sample of complex permittivity, a measurement environment, and a measurement device.

SUMMARY OF THE INVENTION

In such a background, the present disclosure is to provide a complex permittivity estimating apparatus and a method for estimating complex permittivity of an arbitrary dielectric by comparing a reflected wave and a transmitted wave measured in the arbitrary dielectric with simulation data.

In order to solve the problems described above, according to one aspect of the present disclosure, there is provided a complex permittivity estimating apparatus including: a receiver that irradiates a transmission signal such that the transmission signal is reflected on a test dielectric or transmitted through the test dielectric and receives a reflected wave and a transmitted wave for the test dielectric; a determiner that determines simulation data from a simulation table set in advance based on information extracted from at least one of the reflected wave or the transmitted wave; and an estimator that estimates complex permittivity for the test dielectric based on the determined simulation data.

According to another aspect of the present disclosure, there is provided a complex permittivity estimating method including: irradiating a transmission signal such that the transmission signal is reflected on a test dielectric or transmitted through the test dielectric and receiving a reflected wave and a transmitted wave for the test dielectric; determining simulation data from a simulation table set in advance based on information extracted from at least one of the reflected wave or the transmitted wave; and estimating complex permittivity for the test dielectric based on the determined simulation data.

According to the present disclosure, by using simulation data, a complex permittivity estimating apparatus and a method for accurately estimating complex permittivity of a dielectric by employing inexpensive devices and components can be provided.

BRIEF DESCRIPTION OF THE DRAWINGS

FIG. 5 is a diagram illustrating measurement of a phase of a transmitted wave according to one embodiment.

DETAILED DESCRIPTION OF THE INVENTION

Figure 1:
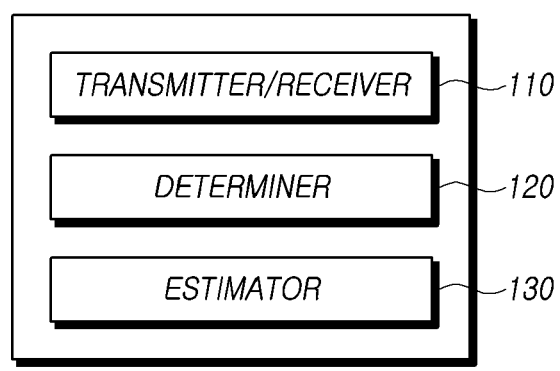
FIG. 1 is a block diagram illustrating a complex permittivity estimating apparatus according to one embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, although a band of signals that are transmitted or received are assumed to be a band of millimeter waves in description, the band is not limited thereto.

Hereinafter, a complex permittivity estimating apparatus (10) according to one embodiment of the present disclosure, which estimates complex permittivity of a dielectric (230) by using simulation data, will be described with reference to the attached drawings.

FIG. 1 is a block diagram illustrating the complex permittivity estimating apparatus (10) according to one embodiment of the present disclosure.

Referring to FIG. 1, the complex permittivity estimating apparatus (10) according to one embodiment of the present disclosure may include a transmitter/receiver (110), a determiner (120), and an estimator (130), and the like.

The transmitter/receiver (110) may transmit a signal to the outside or may receive an external signal. In this case, an electric signal may be irradiated in the form of an electromagnetic wave through a transmission antenna or may be received through a reception antenna.

As an example, the transmitter/receiver (110) may irradiate a transmission signal such that the transmission signal is reflected on the dielectric or transmitted through the dielectric and may receive a reflected wave and a transmitted wave for the dielectric. Here, the dielectric may be a test dielectric that is a test target for actually estimating the permittivity according to the present disclosure. In such a case, the test dielectric may include an arbitrary dielectric that is a target for estimating complex permittivity.

As another example, the transmitter/receiver (110) may transmit a test signal. In such a case, the test signal may be a signal used for estimating permittivity of the test dielectric. The test signal may be set in advance for at least one parameter, and the test signal may be used for measurement of permittivity.

The test signal may be set in advance for at least one parameter of a frequency band, a wavelength, an irradiation intensity, or an irradiation direction. In addition, the test signal may be set differently in consideration of a test environments including a material and a thickness of a dielectric, a type and a performance of an antenna, and the like.

For example, in a case where the test dielectric is a planar dielectric having a constant thickness, the test signal may be set as a signal in the form of a planar wave irradiating in a direction perpendicular to a plane of the test dielectric. In addition, the test signal may be set in consideration of a gain, power efficiency, directivity, and the like of an antenna.

As another example, the transmitter/receiver (110) may receive a reflected wave signal appearing in accordance with a transmission signal being reflected on the test dielectric and a transmitted wave signal appearing in accordance with a transmission signal being transmitted through the dielectric.

In such a case, the reflected wave signal may include reflected wave magnitude information and reflected wave phase information, and the transmitted wave signal may include transmitted wave magnitude information and transmitted wave phase information.

The test dielectric may be mounted outside the complex permittivity estimating apparatus (10). In such a case, the dielectric may be mounted at a position at which a reflected wave and a transmitted wave for the test dielectric is able to be generated through a transmission signal of a transmission antenna and a position at which a reflected wave or a transmitted wave is able to be received through a reception antenna.

As one example, a transmitter included in the transmitter/receiver (110) may include an oscillator that generates a transmission signal for one transmission channel assigned to a transmission antenna (210) or a multiple transmission channel assigned to a plurality of transmission antennas (210). For example, such an oscillator may include a Voltage-Controlled Oscillator (VCO), an oscillator, and the like.

As one example, a receiver included in the transmitter/receiver (110) may include a Low Noise Amplifier (LNA) that amplifies a reflected signal received through a reception antenna (220) (in other words, a plurality of reception channels) with a low noise, a mixer that mixes reception signals that have been amplified with a low noise, an amplifier that amplifies a mixed reception signal, a converter (Analog Digital Converter (ADC)) that generates reception data by converting the amplified reception signal into a digital signal, and the like.

The determiner (120) may extract predetermined information based on a transmission signal and a reception signal. In such a case, extraction of specific information based on a transmission signal or a reception signal according to a criterion set in advance may be included. Alternatively, new information may be determined using a method of performing an additional arithmetic operation on the extracted information.

As one example, the determiner (120) may extract reflected wave magnitude information and reflected wave phase information based on a reflected wave for the test dielectric and may extract transmitted wave magnitude information and transmitted wave phase information based on a transmitted wave. Information that is measured with reference to the time domain may be extracted for a reflected wave and a transmitted wave.

As another example, the determiner (120) may determine simulation data based on a simulation table that has been set in advance based on the information extracted from the reflected wave and the transmitted wave.

Here, the simulation table may include simulation data for each dielectric relating to a simulation result for at least two or more dielectrics. In such a case, the simulation data may include information relating to a simulation according to changes in the complex permittivity, information about a reflected wave simulation, and information about a transmitted wave simulation for each dielectric.

More specifically, the simulation data may include reflection coefficient information of a reflected wave, reflected wave magnitude information and reflected wave phase information, transmission coefficient information of a transmitted wave, transmitted wave magnitude information and transmitted wave phase information, loss tangent information, dielectric constant information, complex permittivity information, and the like for each dielectric. In such a case, the complex permittivity information may be information in a form including loss tangent information as a part of an imaginary number and dielectric constant information as a part of a real number.

As another example, the determiner (120) may set a search condition based on information extracted from a reflected wave and a transmitted wave for the test dielectric. Then, a search can be performed for the simulation table in accordance with the search condition. Thereafter, a search result can be determined as simulation data.

As another example, the determiner (120) may extract reflected wave magnitude information, transmitted wave magnitude information, and transmitted wave phase information from a reflected wave and a transmitted wave and may determine simulation data by comparing the reflected wave magnitude information, the transmitted wave magnitude information, and the transmitted wave phase information with information included in the simulation table. Thereafter, dielectric constant information and loss tangent information may be determined based on the determined simulation data.

As another example, the determiner (120) may set a first search condition that is based on the reflected wave magnitude information and the transmitted wave magnitude information described above and a second search condition that is based on the transmitted wave phase information described above. Thereafter, a first search result satisfying the first search condition may be determined using the simulation table, and a second search result satisfying the second search condition may be determined within the first search result.

Here, the first search condition may be set as a condition for searching simulation data relating to a dielectric of which a reflected wave magnitude and a transmitted wave magnitude coincide with the reflected wave magnitude information and the transmitted wave magnitude information from the simulation table.

The second search condition may be set as a condition for searching for simulation data relating to a dielectric coinciding with the transmitted wave phase information and the transmitted wave magnitude information in the simulation table.

In such a case, a first search result and a second search result may be compared with each other based on a determination result acquired by the determinator (120), and one piece of simulation data may be selected as a result of the comparison. Then, complex permittivity may be estimated based on the selected simulation data.

Such selection of simulation data and estimation of complex permittivity will be described below again in a part relating to the determiner (130).

Alternatively, the second search condition may be set as a condition for searching for simulation data relating to a dielectric of which a phase difference from the transmitted wave phase information described above is the smallest from the simulation table. In this way, the search condition may be set as being satisfied although two pieces of information are not completely the same.

For example, in a case where a reflected wave magnitude and a transmitted wave magnitude of a dielectric A have been measured or known, a simulation data search can be performed using a method of comparing the reflected wave magnitude and the transmitted wave magnitude of the dielectric A with the reflection coefficient information and the loss tangent information for each dielectric included in the simulation data. Then, in a case where a matching dielectric is found as a result of the search, a dielectric constant of the dielectric A may be determined using dielectric constant information of the found dielectric a. Complex permittivity of the dielectric A may be estimated using the dielectric constant information and the loss tangent information of the dielectric a.

Depending on the situations, regarding a simulation data search, two or more dielectrics may be found in one search, or two or more searches may be performed. Each search may be performed in a stepped manner.

If described using an example, dielectrics may be retrieved from the simulation data in a stepped manner through "Search 1" and "Search 2". In such a case, a search result of "Search 1" may be used in "Search 2".

In "Search 1", a search is performed using a method of comparing a reflected wave magnitude and a transmitted wave magnitude for a dielectric B with the reflected wave magnitude information and the transmitted wave magnitude information for each dielectric included in the simulation data, and dielectrics b1 and b2 may be retrieved.

In "Search 2", a search may be performed using a method of comparing transmitted wave phase information for the dielectric B with the transmitted wave phase information of dielectrics b1 and b2 included in the simulation data based on a search result of "Search 1".

Then, in this example, in a case where a transmitted wave phase of the dielectric B is retrieved as being +18 degrees, transmitted wave phase information of the dielectric b1 is retrieved as being +10 degrees, and transmitted wave phase information of the dielectric b2 is retrieved as being +20 degrees in "Search 2", a transmitted wave phase difference between the dielectric B and a dielectric retrieved from the simulation data may be determined as |(+18 degrees)−(+10 degrees)|=8 degrees in the case of the dielectric b1, and the transmitted wave phase difference may be determined as |(+18 degrees)−(+20 degrees)|=2 degrees in the case of the dielectric b2.

In such a case, the phase difference between the dielectric b2 and the dielectric B (2 degrees) is smaller than the phase difference between the dielectric b1 and the dielectric B (8 degrees), and thus the dielectric b2 may be selected. Thereafter, a dielectric constant of the dielectric B may be determined using the dielectric constant information of the dielectric b2. Complex permittivity of the dielectric B may be estimated using dielectric constant information and loss tangent information of the dielectric b2.

As another example, comparison and a search of simulation data may be also performed using the dielectric constant as a reference. For example, as in the embodiment relating to "Search 1" and "Search 2", also in a case where dielectrics b1 and b2 are retrieved through "Search 1", and a dielectric B is retrieved through "Search 2", comparison and a search may be performed using the dielectric constant as a reference.

In such a case, in a case where a dielectric constant of the dielectric b1 is retrieved as 2.57, a dielectric constant of the dielectric b2 is retrieved as 2.80, and a dielectric constant of the dielectric B is retrieved as 2.76, the dielectric constants of the dielectrics b1 and b2 may be compared with each other with reference to 2.76 that is the dielectric constant of the dielectric B.

Then, as a comparison result, a dielectric constant difference between the dielectrics B and b1 can be determined to be 2.76−2.57=0.19, and a dielectric constant difference between the dielectrics B and b2 can be determined to be 2.80−2.76=0.04. Based on such a determination result, simulation data for the dielectric b2 of which the dielectric constant difference from the dielectric B is relatively small may be selected, and thereafter, estimation of complex permittivity based on the simulation data for the dielectric b2 may be performed by the determiner (130).

Determination of coincidence/non-coincidence between values to be compared may include that coincidence is determined not only in the case of complete coincidence between the values but also in the case of a difference between the values being within a coincidence range set in advance. In such a case, the setting of the coincidence range may be performed using an absolute range scheme using absolute magnitudes of values to be compared as references or may be performed using a ratio range scheme using relative magnitudes of values to be compared as references. This may be applied also to another embodiment according to the present disclosure.

The estimator (130) may estimate complex permittivity of a test dielectric using dielectric constant information and loss tangent information of a dielectric selected through comparison and a search using the simulation data.

As one example, a dielectric constant and complex permittivity of a dielectric may be estimated to be a dielectric constant and complex permittivity of a dielectric acquired by performing comparison and a search based on information about a transmitted wave for each dielectric from the simulation data.

In such a case, a result of the comparison and the search performed by the determiner (120) may include a first search result according to a first search condition set based on the reflected wave magnitude information and the transmitted wave magnitude information and a second search result according to a second search condition set based on the transmitted wave phase information.

Then, the estimator (130) may compare the first search result with the second search result based on the determination result acquired by the determiner (120), and one piece of simulation data may be selected as a result of the comparison. Then, complex permittivity may be estimated based on the selected simulation data.

In a case where there are two or more pieces of first search simulation data included in the first search result, comparison reference information may be set based on the second search result, and simulation data of which a difference value from the comparison reference information is the smallest in the first search simulation data may be selected.

Here, the comparison reference information may be set based on one of the transmitted wave phase information, the dielectric constant information, or the complex permittivity information included in the second search result.

For example, in a case where simulation data A and simulation data B are retrieved in the first search result, and simulation data C is retrieved in the second search result, simulation data relating to one of A and B included in the first search result may be selected based on the comparison reference information that is set based on the second search result.

As a more specific example, if an embodiment in which simulation data is selected using the dielectric constant information as a reference is described, dielectric constant information of the simulation data A may be retrieved as 2.57, dielectric constant information of the simulation data B may be retrieved as 2.80, and dielectric constant information of the simulation data C may be retrieved as 2.76. In such a case, the dielectric constant information of A and B included in the first search result may be compared with each other with reference to 2.76 that is the dielectric constant information of the simulation data C included in the second search result. Then, as a result of the comparison, a difference value from 2.76 that is the comparison reference information is 2.76−2.57=0.19 in the case of A and is 2.80−2.76=0.04 in the case of B, and thus, based on this, the simulation data B of which the difference value from the comparison reference information is the smallest in the first search simulation data may be selected.

As another example, a dielectric constant and complex permittivity of a dielectric may be estimated to be values acquired by correcting a dielectric constant and complex permittivity of a dielectric selected from the simulation data as a reference in consideration of a transmitted wave phase delay of the dielectric (230).

For example, in a case where the dielectric b2 is selected as a result of comparison and a search using the simulation data for estimating permittivity of the dielectric B, and a dielectric constant and a loss tangent of the dielectric b2 are respectively 2.80 and 0.007, the complex permittivity of the dielectric b2 may be determined to be 2.80−j*0.007.

In such a case, the dielectric constant and the complex permittivity of the dielectric B may be respectively estimated to be 2.80 and 2.80−j*0.007 by using the simulation data of the dielectric b2.

Alternatively, as a result acquired by using the simulation data of the dielectric b2 as a reference with a transmitted wave phase delay with taken into account, the dielectric constant and the loss tangent may be respectively corrected to 2.76 and 0.008. In such a case, the dielectric constant and the complex permittivity of the dielectric B may be respectively estimated to be 2.76 and 2.76−j*0.008.

As described above, according to the present disclosure, permittivity of a dielectric is estimated by comparing reflected wave and transmitted wave measurement information for a dielectric with the simulation data that has been set in advance, and thus uncertainty due to changes according to changes in the characteristics of a dielectric such as a thickness, etching, and a moisture of the dielectric, a measurement error, and the like can be eliminated, and the accuracy of estimation of permittivity can be improved. In addition, the present disclosure includes a configuration for estimating permittivity using not only the transmitted wave measurement information but also information such as a reflected wave magnitude and the like, and thus there is an effect of an estimation error occurring due to a phase delay or the like according to transmission through a dielectric being decreased.

Such an effect becomes clearer in a case where it is difficult to accurately measure the transmitted wave phase using a general measurement device due to a short wavelength.

For example, in a case where complex permittivity is estimated in an environment in which the wavelength is very short like millimeter waves, in order to improve the accuracy of estimation, a measurement method capable of more accurately measuring a phase delay and the like may be used. In such a case, an expensive measurement device such as a millimeter wave measurement device may be required to be used. In accordance with this, there may be a disadvantage in that a high cost is necessary for estimating complex permittivity.

On the other hand, in a case where permittivity is estimated based on information about a reflected wave and a transmitted wave as in the present disclosure, complex permittivity of an arbitrary dielectric can be estimated more accurately and efficiently without using an expensive measurement device.

Figure 2:
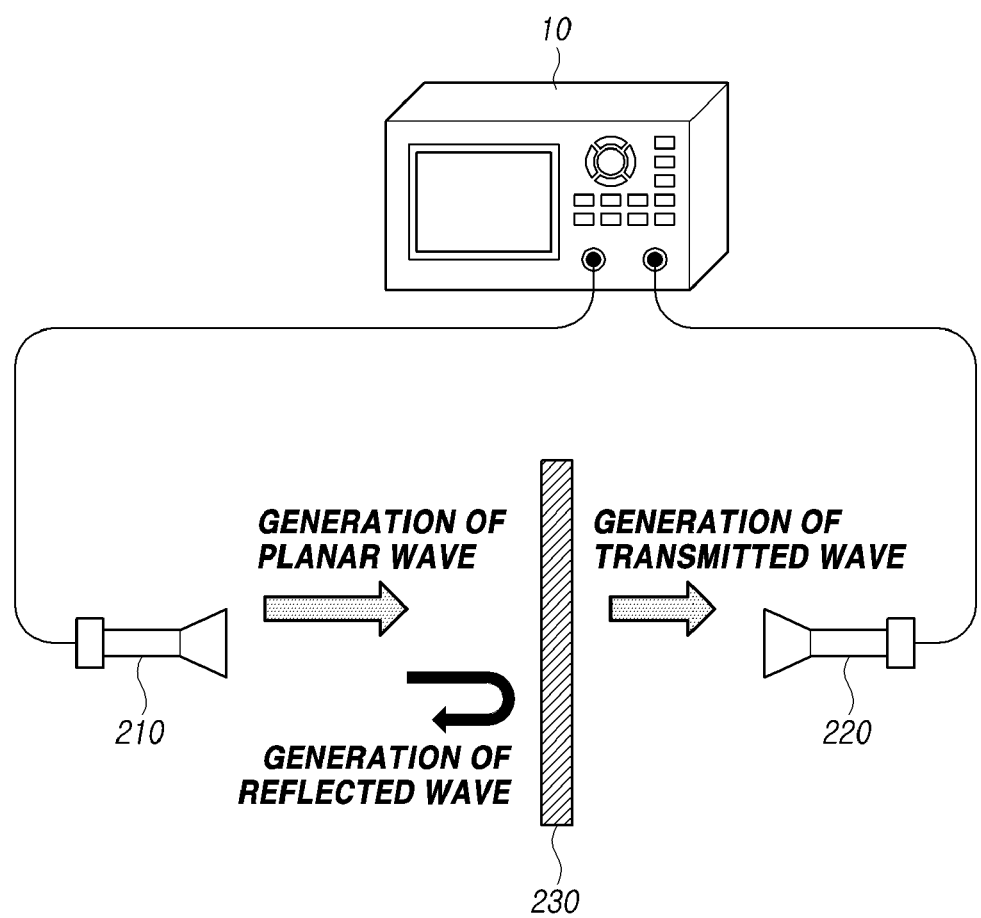
FIG. 2 is a diagram schematically illustrating irradiation of signals to a dielectric through an antenna and reception of a reflected or transmitted signal using the complex permittivity estimating apparatus according to one embodiment of the present disclosure.

FIG. 2 is a diagram schematically illustrating irradiation of signals to a dielectric (230) through an antenna and reception of a reflected or transmitted signal using the complex permittivity estimating apparatus (10) according to one embodiment of the present disclosure.

In FIG. 2, transmission and reception of signals may be performed using an antenna. For this, the complex permittivity estimating apparatus (10) may further include an antenna.

The antenna may include a transmission antenna (210) that irradiates signals and a reception antenna (220) that receives signals obtained in accordance with transmission and reflection of irradiated signals. Here, each antenna may perform both transmission and reception depending on the purpose or a setting scheme.

In one embodiment, the transmission antenna (210) may irradiate signals toward a reflection plate formed of steel and receive reflected signals as well.

In the present disclosure, although horn antennas may be used as the transmission antenna (210) and the reception antenna (220), the configuration is not limited thereto. In the present disclosure, although planar waves may be irradiated as signals, the configuration is not limited thereto.

The complex permittivity estimating apparatus (10) may determine simulation data satisfying a first criterion by comparing a reflected wave and a transmitted wave with a plurality of pieces of simulation data included in the simulation table as a result of the comparison.

Figure 3:
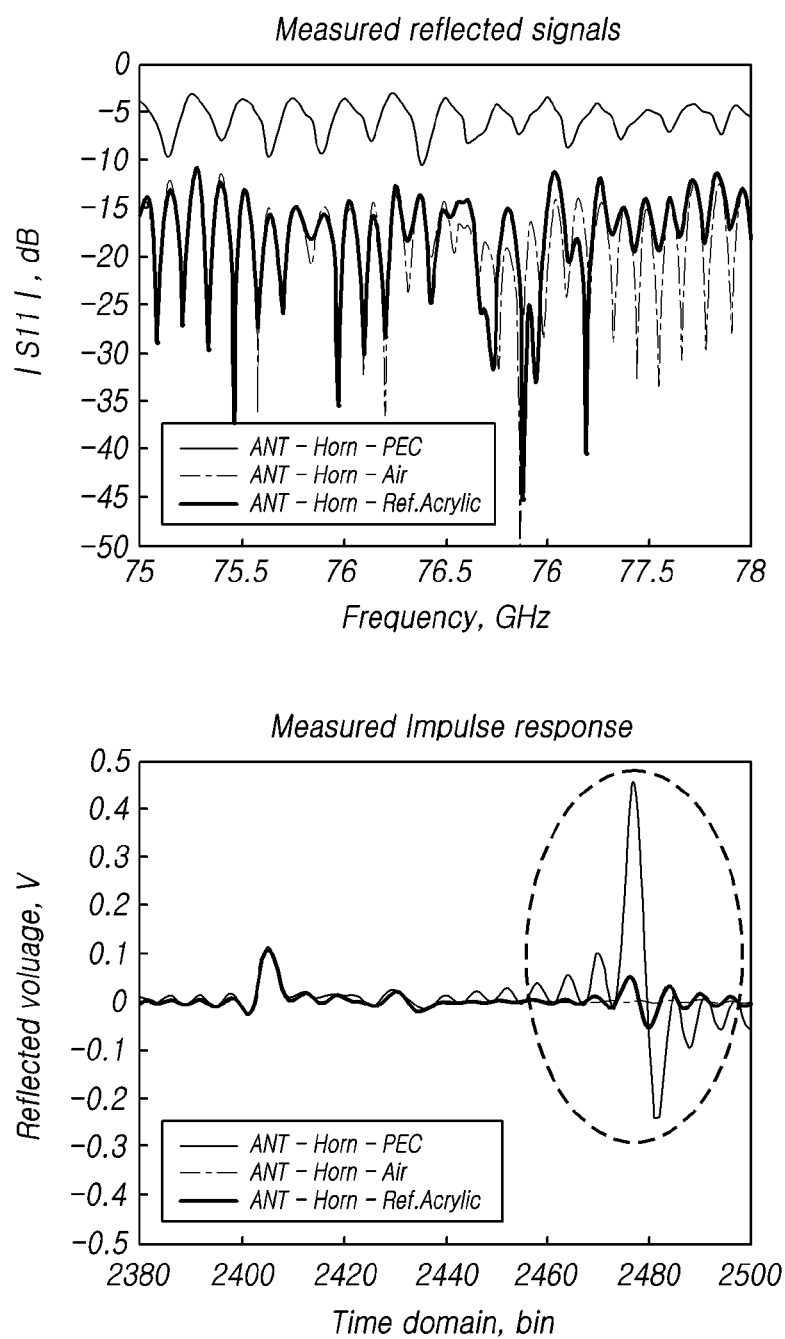
FIG. 3 is a diagram illustrating measurement of a magnitude of a reflected wave according to one embodiment.

FIG. 3 is a diagram illustrating detection of reflected wave signals according to one embodiment.

Referring to FIG. 3, reflected waves may be measured based on the frequency domain or may be measured based on the time domain. In such a case, it may be advantageous to use a time domain measurement result depending on characteristics of electric waves.

For example, in the case of millimeter waves of which wavelengths are very short, it is difficult to measure a signal reflected on or transmitted through a dielectric. In such a case, it is relatively more advantageous to extract information measured with reference to the time domain and use the extracted information for estimation of permittivity of a dielectric.

As the magnitude of a reflected wave, a result of measurement performed in an acrylic state with reference to a result of irradiation of signals toward the reflection plate described above may be used. Accordingly, the reflection plate formed of iron reflects all the signals and thus the magnitude of a reflected wave is determined to be 0 dB of no loss, and the magnitude of a reflected wave reflected on an arbitrary dielectric may be measured to be a peak to peak (PP) of 0.1093 V and −16.20 dB. In other words, it may be checked that the magnitude of a reflected wave for an arbitrary dielectric decreases from the magnitude of a reflected wave measured for a reflection plate in a measurement system configured using inexpensive devices by −16.20 dB.

Figure 4:
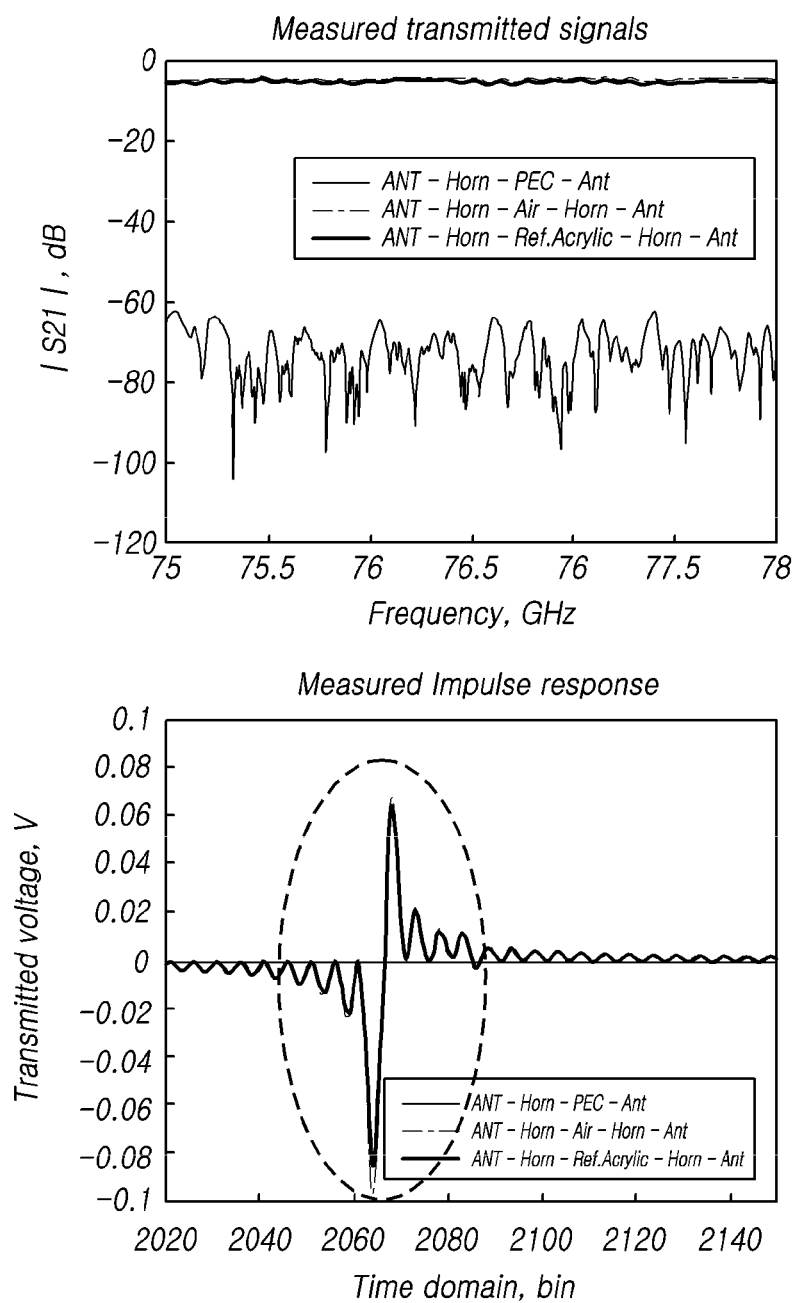
FIG. 4 is a diagram illustrating measurement of a magnitude of a transmitted wave according to one embodiment.
Figure 6:
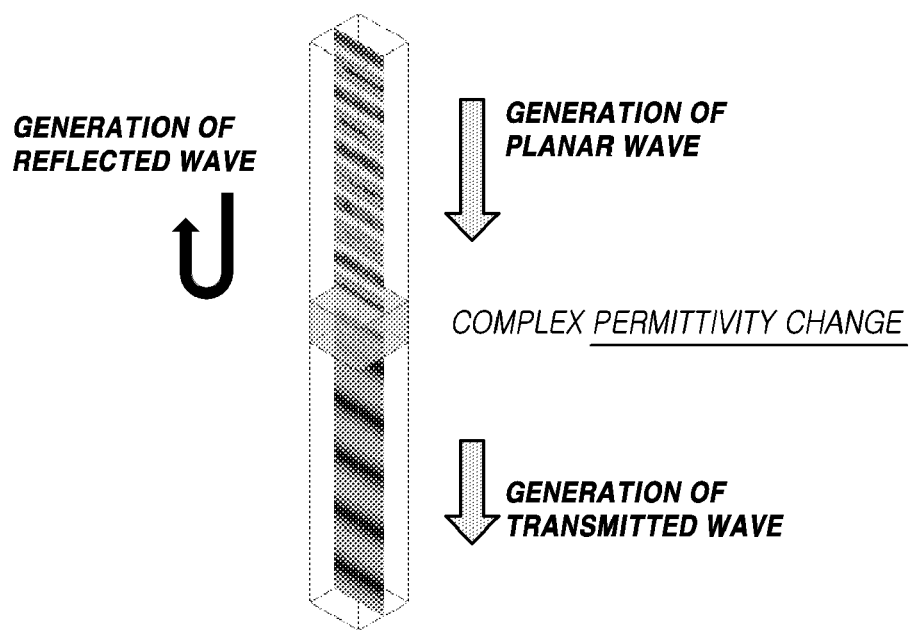
FIGS. 6 to 9 are diagrams illustrating a simulation table according to one embodiment.
Figure 7:
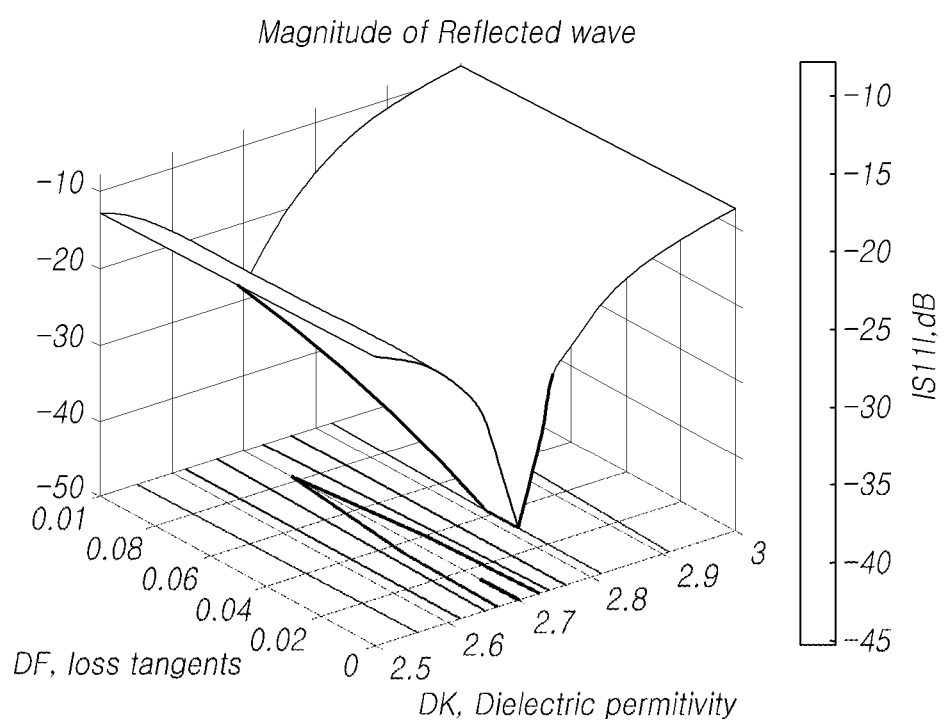
Figure 8:
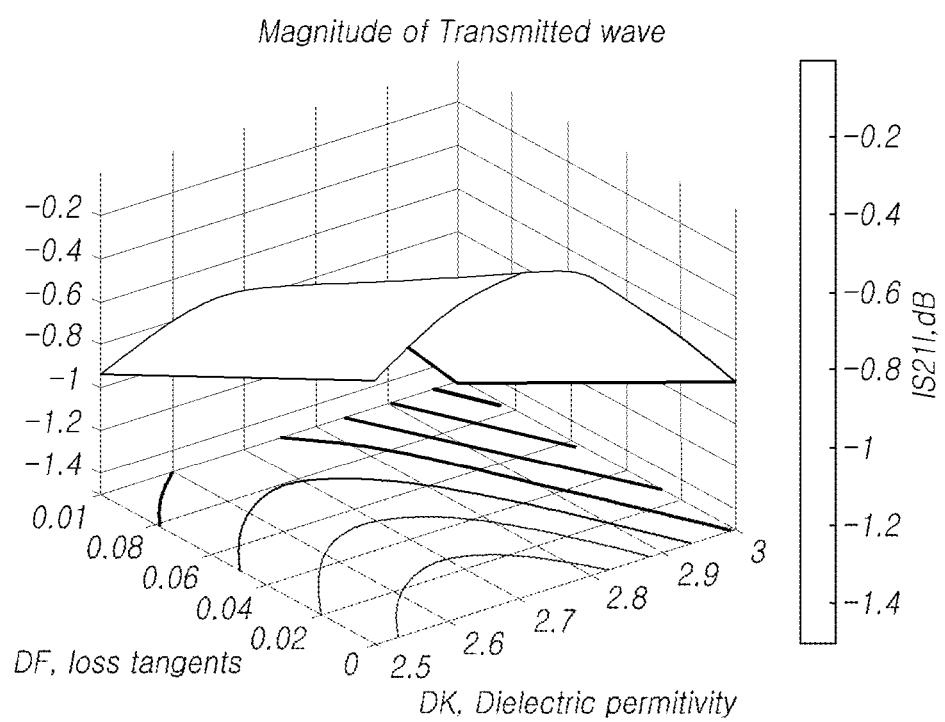
Figure 9:
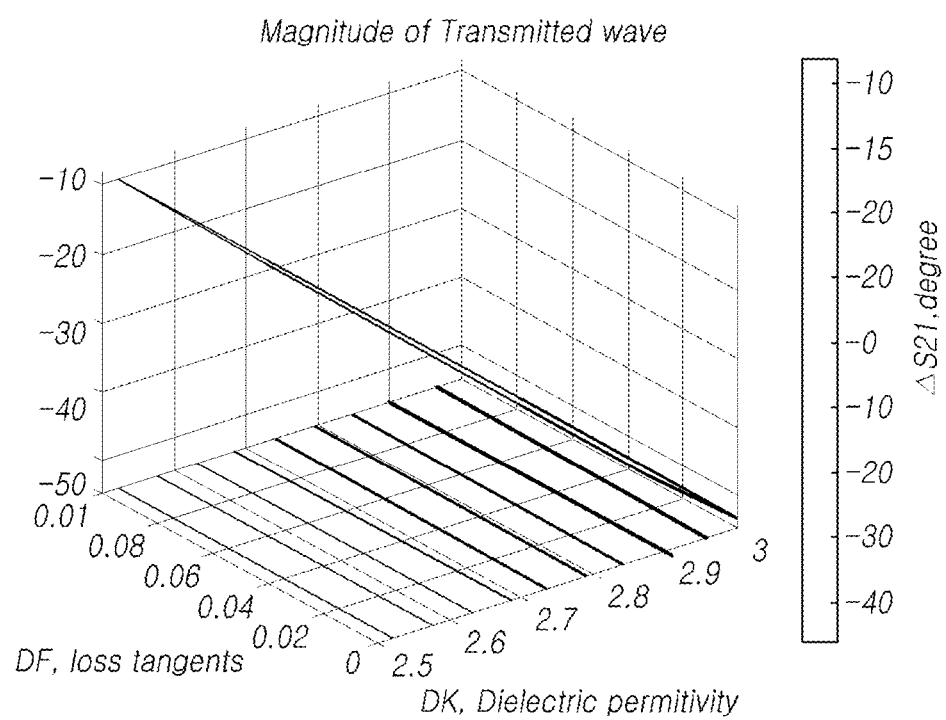

FIG. 4 is a diagram illustrating measurement of a magnitude of a transmitted wave according to one embodiment, and FIG. 5 is a diagram illustrating measurement of a phase of a transmitted wave according to one embodiment.

Referring to FIG. 4, a visual difference in the magnitude of a transmitted wave can be checked in the time domain more than in the frequency domain. The magnitude of a transmitted wave may be measured with reference to a signal in the air. As one example, as illustrated in FIG. 4, the reference magnitude of a transmitted wave has a PP of 0.1654 V and 0 dB, and the magnitude of a transmitted wave may be measured to have a PP of 0.1526 V and a loss of 0.70 dB. In accordance with the description presented above, the determiner (120) may determine the magnitude of a transmitted wave for the dielectric (230) with reference to the magnitude of a transmitted wave measured in the air.

Referring to FIG. 5, differences in the phase of a transmitted wave may be checked in the frequency domain. The phase of a transmitted wave may be measured as an amount of delay with reference to the phase of a transmitted wave in the air. The phase of a transmitted wave may be delayed from the phase of the signal in a state in which only the air is present. By using such a point, the phase of a transmitted wave for the dielectric (230) may be determined with reference to the phase of the signal that is in the state in which only the air is present. As one example, as illustrated in FIG. 5, the phase of a transmitted wave may be delayed from the phase of the signal in the state in which only the air is present by −5.2 degrees, and the phase of the transmitted wave may be determined using such a phase delay.

FIGS. 6 to 9 are diagrams for describing a simulation table according to one embodiment.

Referring to FIGS. 6 to 9, the complex permittivity estimating apparatus (10) may compare information about a transmitted wave and a reflected wave that have been received after irradiation of a signal to the dielectric (230) with simulation data included in the simulation table and determine a comparison result.

The simulation table may be a set of data for specific situations acquired by assuming the situations. For example, a reflected wave and a transmitted wave generated by irradiating a planar wave to a dielectric (230) having the same thickness as the thickness of an arbitrary dielectric measured by a measurement system composed of inexpensive devices may be stored, a dielectric constant (dielectric permittivity (DK)) and a loss tangent (DF) may be determined based on the information of each thereof, and complex permittivity determined for each thereof may be stored in the simulation table. In accordance with this, information about a reflected wave and a transmitted wave according to changes in the dielectric constant and the loss tangent of a dielectric (230) having the same thickness as that of an arbitrary dielectric may be stored in the simulation table.

As one example, the simulation table may include a plurality of pieces of simulation data. In such a case, dielectric information about a material, a shape, a pattern, a size, a thickness, and the like of each dielectric may be stored for each piece of simulation data. In each piece of the simulation data, data relating to a result of a simulation performed for a dielectric corresponding to each piece of dielectric information may be included. The simulation may include a simulation for measuring an incident wave, a reflected wave, and a transmitted wave for an arbitrary dielectric. For example, the simulation may include a simulation for measuring a reflected wave and a transmitted wave for a dielectric of which a thickness is fixed by causing a planar wave to be incident to the dielectric of which the thickness is fixed as a target.

Then, a search may be performed such that simulation data satisfying a search condition set in advance is performed on such a simulation table. After that, other information included in the retrieved simulation data may be set as being output together.

For example, a search condition for searching the simulation table for simulation data having a specific dielectric constant value and a specific loss tangent value may be set, and simulation data retrieved in accordance with the set search condition may be set to be output together with reflective wave magnitude information, reflective wave phase information, transmitted wave magnitude information, and transmitted wave phase information.

Referring to FIGS. 6 to 9, changes in a dielectric constant and a loss tangent corresponding to a magnitude of a reflected wave (FIG. 7), a magnitude of a transmitted wave (FIG. 8), and a phase of the transmitted wave (FIG. 9) may be checked from the simulation table. The dielectric constant and the loss tangent corresponding to a magnitude of a reflected wave, a magnitude of a transmitted wave, and a phase of the transmitted wave for a specific dielectric (230) may be defined as simulation data.

In the simulation table, simulation data for a plurality of dielectrics may be included. In such a case, the simulation data may include simulation data for each dielectric for a result acquired by performing a simulation with a material, the shape, the size, the thickness, or the like of a dielectric being differently set. In addition, the simulation data for each dielectric may include data relating to a simulation for measuring magnitudes, phases, and the like of an incident wave, a reflected wave, and a transmitted wave by irradiating a planar wave toward each dielectric in a vertical direction.

The first criterion described above may be being in correspondence with a dielectric constant and a loss tangent determined from a magnitude of a reflected wave and a magnitude of a transmitted wave received by irradiating a signal to the dielectric (230).

More specifically, a reflected wave and a transmitted wave are received in accordance with irradiation of a signal to a dielectric (230), and as described above, a magnitude of the reflected wave and a magnitude of the transmitted wave may be determined in accordance with each criterion. Then, a dielectric constant and a loss tangent corresponding to each magnitude of the reflected wave and each magnitude of the transmitted wave may be determined. The determiner (120) may determine a plurality of pieces of simulation data as a comparison result by comparing the dielectric constant and the loss tangent determined in this way with the simulation data included in the simulation table and determining whether the simulation data corresponds to the dielectric constant and the loss tangent that have been determined which is the first criterion.

The complex permittivity estimating apparatus (10) may further determine simulation data satisfying a second criterion as a comparison result.

Here, the second criterion may be being in correspondence with a dielectric constant and a loss tangent corresponding to a phase of a transmitted wave. In accordance with this, the determiner (120) may determine simulation data satisfying the second criterion described above as a comparison result.

FIGS. 10 to 13 are diagrams for describing estimation of complex permittivity based on the simulation table according to one embodiment.

The estimator (130) may estimate complex permittivity for a dielectric (230) based on a comparison result determined by the determiner (120).

In one embodiment, the estimator (130) may estimate simulation data satisfying both the dielectric constant and the loss tangent determined from the magnitude of the reflected wave and the magnitude of the transmitted wave in the comparison result satisfying the first criterion as complex permittivity.

In another embodiment, in a case where there are a plurality of pieces of simulation data satisfying both the dielectric constant and the loss tangent determined from the magnitude of the reflected wave and the magnitude of the transmitted wave, the estimator (130) may estimate complex permittivity based on simulation data having a dielectric constant close to the dielectric constant determined from the phase of the transmitted wave.

Figure 10:
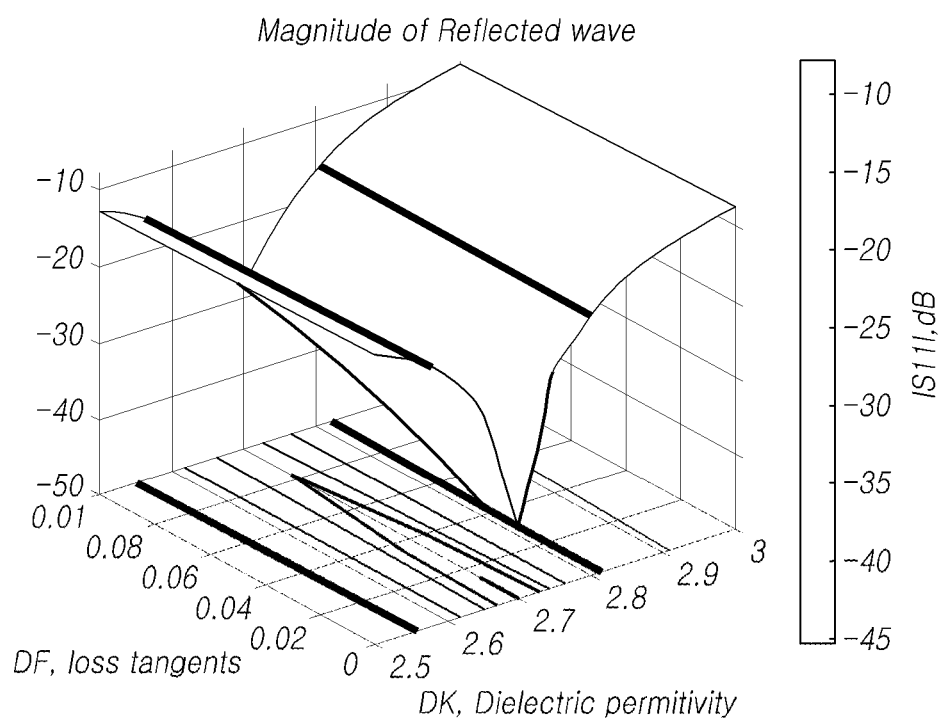
FIGS. 10 to 13 are diagrams for describing estimation of complex permittivity based on a simulation table according to one embodiment.
Figure 11:
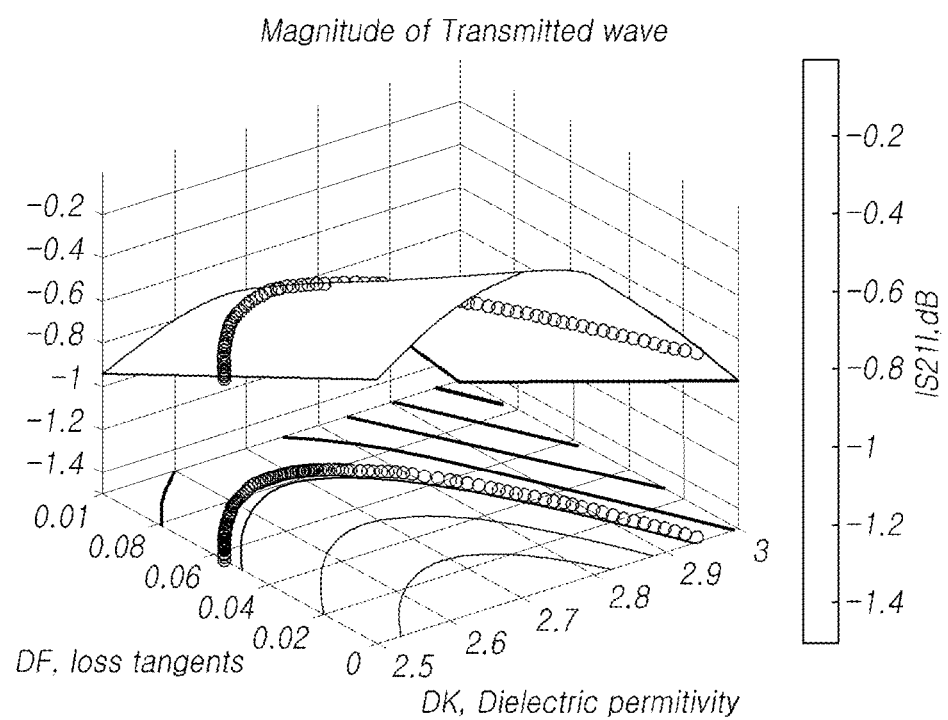
Figure 12:
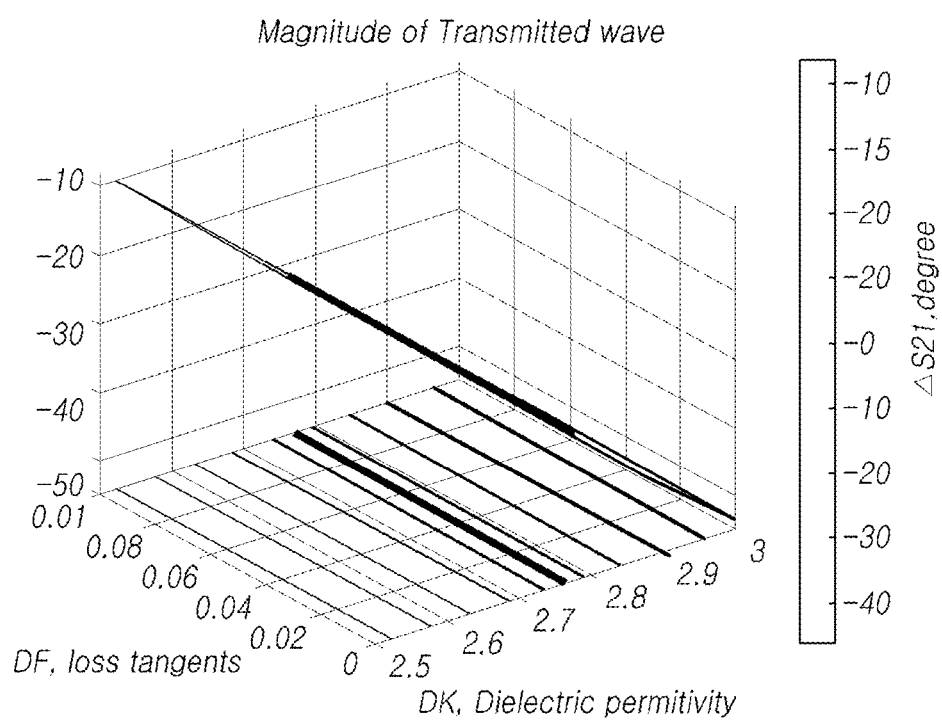

Referring to FIGS. 10 to 12, the determiner (120) is able to determine a comparison result in which simulation data satisfying the first criterion and the second criterion is included.

For example, a comparison result in which the magnitude of the reflected wave in the measurement result represented in FIG. 3 has the dielectric constant and the loss tangent as represented in FIG. 10 may be determined.

As another example, a comparison result in which the magnitude of the transmitted wave in the measurement result represented in FIG. 4 has the dielectric constant and the loss tangent as represented in FIG. 11 may be determined.

In addition, as yet another example, a comparison result in which the phase of the transmitted wave in the measurement result represented in FIG. 5 has the dielectric constant and the loss tangent as represented in FIG. 12 may be determined.

Figure 13:
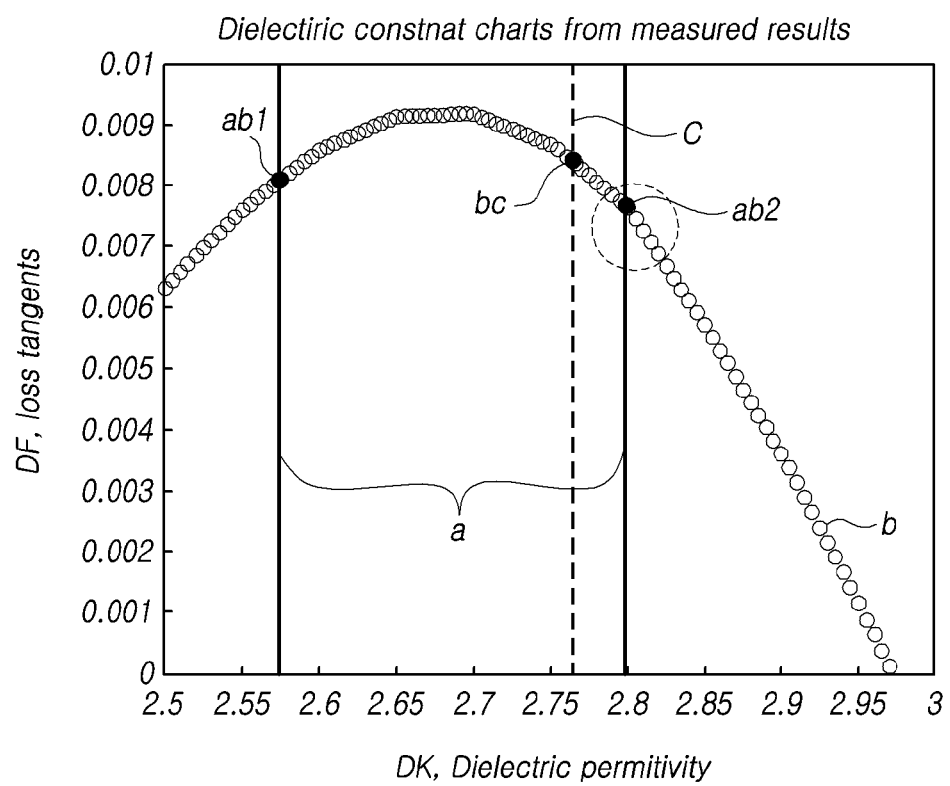

If the comparison result determined from the magnitude of the reflected wave, the magnitude of the transmitted wave, and the phase of the transmitted wave, which is the comparison result described above, is represented in two-dimensional coordinates of the dielectric constant—the loss tangent, the comparison result may be represented as in FIG. 13.

Referring to FIG. 13, a case where a plurality of results satisfying both the dielectric constant and the loss tangent determined from the magnitude of the transmitted wave and the magnitude of the reflected wave in accordance with the first criterion are present may occur. In such a case, the estimator (130) may further determine a comparison result according to the second criterion and estimate a result closer to the dielectric constant and the loss tangent value at the phase of the transmitted wave in the plurality of results described above as complex permittivity.

For example, simulation data satisfying a dielectric constant and a loss tangent determined at the transmitted wave magnitude and the reflected wave magnitude in accordance with the first criterion may be determined as two intersections ab1 and ab2 between a and b as illustrated in FIG. 13.

In addition, simulation data corresponding to a dielectric constant and a loss tangent corresponding to the transmitted wave phase according to the second criterion may be determined as an intersection bc between b and c as illustrated in FIG. 13.

In such a case, by comparing ab1 and ab2 with bc, ab2 that is relatively closer to bc may be selected, and, based on simulation data relating to the selected ab2, the complex permittivity of ab2 may be estimated as complex permittivity of the test dielectric.

Hereinafter, the complex permittivity estimating apparatus (10) will be briefly described again from the aspect of a method, details that are duplicate with the details described above will be omitted as necessary, and all the details described above are applicable also from the aspect of the method described below.

Figure 14:
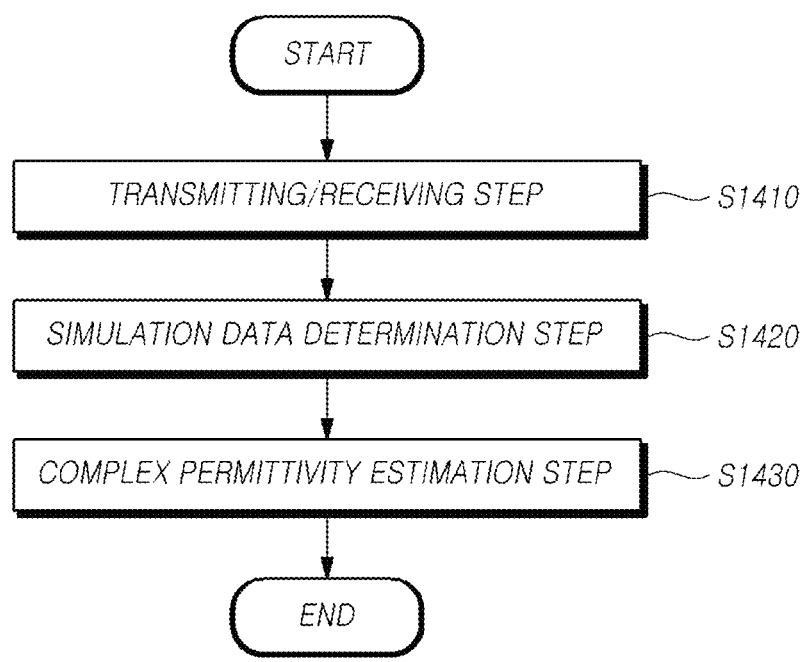
FIG. 14 is a flowchart illustrating a complex permittivity estimating method according to one embodiment of the present disclosure.

FIG. 14 is a flowchart illustrating a complex permittivity estimating method according to one embodiment of the present disclosure.

Referring to FIG. 14, the complex permittivity estimating method according to the present disclosure may include: a transmission/reception step (S1410) including irradiating of a transmission signal such that the transmission signal is reflected on a test dielectric or is transmitted through the test dielectric and receiving of a reflected wave and a transmitted wave for the test dielectric; a determination step (S1420) including determining of simulation data from a simulation table set in advance based on information extracted from at least one of the reflected wave or the transmitted wave; and an estimation step (S1430) including estimating of complex permittivity for the test dielectric based on the determined simulation data.

Here, the simulation table may include simulation data for each dielectric relating to simulation results for at least two or more dielectrics. In addition, the simulation table may include a dielectric constant and a loss tangent corresponding to a magnitude of the reflected wave, a magnitude of a transmitted wave, and a phase difference of the transmitted wave.

In the determination step (S1420), simulation data satisfying at least one of the first criterion or the second criterion may be further determined as a result of the comparison.

A first criterion may be being in correspondence with a dielectric constant and a loss tangent determined from the magnitude of the reflected wave and the magnitude of the transmitted wave that have been received. For example, simulation data satisfying the first criterion in the simulation table may be as illustrated in FIGS. 10 and 11.

The second criterion may be being in correspondence with a dielectric constant and a loss tangent corresponding to a phase of the transmitted wave. For example, in the simulation table, simulation data satisfying the second criterion may be as illustrated in FIG. 12.

As one example, in the determination step (S1420), reflected wave magnitude information, transmitted wave magnitude information, and transmitted wave phase information may be extracted from a reflected wave and a transmitted wave. In addition, by comparing the reflected wave magnitude information, the transmitted wave magnitude information, and the transmitted wave phase information that are extracted with the information included in the simulation table, simulation data may be determined. For example, the determination step (S1420) may include a search condition setting step including setting of a first search condition that is based on the reflected wave magnitude information and the transmitted wave magnitude information and a second search condition that is based on the transmitted wave phase information, a first search result determination step including determining of a first search result satisfying the first search condition based on the simulation table, and a second search result determination step including determining of a second search result satisfying the second search condition.

For example, the first search condition may be set such that simulation data relating to a dielectric of which a reflective wave magnitude and a transmitted wave magnitude respectively coincide with the reflected wave magnitude information and the transmitted wave magnitude information in the simulation table is retrieved.

For example, the second search condition may be set such that simulation data relating to a dielectric coinciding with the transmitted wave phase information and the transmitted wave magnitude information is retrieved from the simulation table.

As one example, the determination step (S1420) may include extracting of information measured with reference to the time domain from the reflected wave and the transmitted wave.

As one example, the determination step (S1420) may include determining of dielectric constant information and loss tangent information based on the determined simulation data.

In the estimation step (S1430), simulation data satisfying both the dielectric constant and the loss tangent determined from the magnitude of the reflected wave and the magnitude of the transmitted wave in the comparison result may be estimated as complex permittivity.

In the estimation step (S1430), in a case where there are a plurality of pieces of simulation data satisfying both the dielectric constant and the loss tangent determined from the magnitude of the reflected wave and the magnitude of the transmitted wave, simulation data having a dielectric constant close to the dielectric constant determined from the phase of the transmitted wave may be estimated as complex permittivity.

As one example, the estimation step (S1430) may include selecting of one piece of simulation data by comparing the first search result with the second search result and estimating of complex permittivity based on the selected simulation data.

As one example, in a case where two or more pieces of the first search simulation data included in the first search result are present, the estimation step (S1430) may include setting of comparison reference information based on the second search result and selecting of simulation data of which a difference value from the comparison reference information is the smallest in the first search simulation data. In the determination step (S1420), the magnitude of the transmitted wave for a dielectric (230) may be determined with reference to the magnitude of the transmitted wave measured in the air. Then, in the determination step (S1420), the phase of the transmitted wave for a dielectric (230) may be determined with reference to the phase of the transmitted wave measured in the air.

As described above, according to the present disclosure, a complex permittivity estimating apparatus and a method for accurately estimating complex permittivity of a dielectric by employing inexpensive devices and components using simulation data can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

10: complex permittivity estimating apparatus
110: transmitter/receiver
120: determiner
130: estimator
210: transmission antenna
220: reception antenna
230: dielectric

What is claimed is:

1. A complex permittivity estimating apparatus comprising:
    a receiver that irradiates a transmission signal such that the transmission signal is reflected on a test dielectric or transmitted through the test dielectric and receives a reflected wave and a transmitted wave for the test dielectric;
    a determiner that determines simulation data from a simulation table set in advance based on information extracted from at least one of the reflected wave or the transmitted wave; and
    an estimator that estimates complex permittivity for the test dielectric based on the determined simulation data,
    wherein the determiner determines the simulation data by extracting reflected wave magnitude information, transmitted wave magnitude information, and transmitted wave phase information from the reflected wave and the transmitted wave and comparing the reflected wave magnitude information, the transmitted wave guide magnitude information, and the transmitted wave phase information that are extracted with information included in the simulation table.

2. The complex permittivity estimating apparatus according to claim 1,
    wherein the simulation table includes simulation data for each dielectric relating to a simulation result for at least two or more dielectrics, and
    wherein the determiner determines data relating to a dielectric satisfying a search condition set in advance based on the extracted information in the simulation data for each dielectric.

3. The complex permittivity estimating apparatus according to claim 1, wherein the determiner sets a first search condition that is based on the reflected wave magnitude information and the transmitted wave magnitude information and a second search condition that is based on the transmitted wave phase information and determines a first search result satisfying the first search condition and a second search result satisfying the second search condition based on the simulation table.

4. The complex permittivity estimating apparatus according to claim 3,
    wherein the first search condition is set such that simulation data relating to a dielectric of which a reflected wave magnitude and a transmitted wave magnitude coincide with the reflected wave magnitude information and the transmitted wave magnitude information is retrieved from the simulation table, and
    wherein the second search condition is set such that simulation data relating to a dielectric coinciding with the transmitted wave phase information and the transmitted wave magnitude information is retrieved from the simulation table.

5. The complex permittivity estimating apparatus according to claim 3, wherein the estimator selects one piece of simulation data by comparing the first search result with the second search result and estimates complex permittivity based on the selected simulation data.

6. The complex permittivity estimating apparatus according to claim 3, wherein, in a case in which two or more pieces of the first search simulation data included in the first search result are present, the estimator sets comparison reference information based on the second search result and selects simulation data of which a difference value from the comparison reference information is the smallest in the first search simulation data.

7. The complex permittivity estimating apparatus according to claim 1, wherein the determiner extracts information measured with reference to a time domain from the reflected wave and the transmitted wave.

8. The complex permittivity estimating apparatus according to claim 1,
    wherein the determiner determines dielectric constant information and loss tangent information based on the determined simulation data, and
    wherein the estimator estimates complex permittivity for the test dielectric based on the dielectric constant information and the loss tangent information.

* * * * *